(12) United States Patent
Hawthorne et al.

(10) Patent No.: US 10,901,137 B2
(45) Date of Patent: Jan. 26, 2021

(54) LIGHTING FIXTURE

(71) Applicant: Hubbell Incorporated, Shelton, CT (US)

(72) Inventors: Sean M. Hawthorne, Boston, MA (US); Timothy S. Farrell, Simpsonville, SC (US); Michael F. Conroy, Attleboro, MA (US); Rachel L. Sidiropoulos, Middleboro, MA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/400,121

(22) Filed: May 1, 2019

(65) Prior Publication Data

US 2019/0339439 A1 Nov. 7, 2019

Related U.S. Application Data

(60) Provisional application No. 62/807,307, filed on Feb. 19, 2019, provisional application No. 62/665,165, filed on May 1, 2018.

(51) Int. Cl.
| | |
|---|---|
| *F21V 8/00* | (2006.01) |
| *F21S 8/02* | (2006.01) |
| *F21Y 115/10* | (2016.01) |
| *F21Y 105/00* | (2016.01) |

(52) U.S. Cl.
CPC ............ *G02B 6/0055* (2013.01); *F21S 8/026* (2013.01); *G02B 6/005* (2013.01); *G02B 6/0068* (2013.01); *G02B 6/0075* (2013.01); *F21Y 2105/00* (2013.01); *F21Y 2115/10* (2016.08)

(58) Field of Classification Search
CPC .................................................. G02B 6/0078
See application file for complete search history.

(56) References Cited

U.S. PATENT DOCUMENTS

| | | |
|---|---|---|
| D320,283 S | 9/1991 | Burkarth |
| D399,586 S | 10/1998 | Ranieri et al. |
| D407,473 S | 3/1999 | Wimbock |
| D477,891 S | 7/2003 | Fritze et al. |
| D496,121 S | 9/2004 | Santoro |
| D545,483 S | 6/2007 | Mayfield et al. |
| D556,358 S | 11/2007 | Santoro |
| D561,930 S | 2/2008 | Hukle et al. |
| D572,858 S | 7/2008 | Santoro |
| D595,006 S | 6/2009 | Santoro |
| D597,241 S | 7/2009 | Fabbri |

(Continued)

OTHER PUBLICATIONS

PCT International Search Report and Written Opinion for corresponding PCT Application No. PCT/US2019/030121, dated Aug. 30, 2019 10 pages.

*Primary Examiner* — Joseph L Williams
*Assistant Examiner* — Jacob R Stern
(74) *Attorney, Agent, or Firm* — Michael Best & Friedrich, LLP

(57) ABSTRACT

A lighting fixture can include a first panel and a second panel. The lighting fixture can include a first set of LEDs positioned adjacent to a first edge of the first panel. The lighting fixture can further include a second set of LEDs positioned adjacent to a second edge of the second panel. The lighting fixture can include an illuminated surface positioned to receive light from at least one of the first panel and the second panel.

20 Claims, 19 Drawing Sheets

(56) References Cited

U.S. PATENT DOCUMENTS

| | | |
|---|---|---|
| D608,931 S | 1/2010 | Castelli |
| D614,792 S | 4/2010 | Fabbri |
| D665,119 S | 8/2012 | Bryant |
| D675,364 S | 1/2013 | Watt |
| D678,597 S | 3/2013 | Lehman |
| D701,988 S | 4/2014 | Clements |
| D726,362 S | 4/2015 | Kim |
| D730,556 S | 5/2015 | Toyohisa |
| D733,960 S | 7/2015 | Howe |
| D734,534 S | 7/2015 | Howe |
| D735,401 S | 7/2015 | Clements |
| 9,110,216 B2 | 8/2015 | Blessitt et al. |
| D739,977 S | 9/2015 | Boyer |
| D750,831 S | 3/2016 | Clements |
| 9,335,041 B2 | 5/2016 | Marquardt |
| D767,193 S | 9/2016 | Jung |
| D769,515 S | 10/2016 | Clark |
| D770,083 S | 10/2016 | Clark |
| D786,471 S | 5/2017 | Snell |
| D788,356 S | 5/2017 | Clements |
| 9,666,744 B2 | 5/2017 | Clements |
| D807,557 S | 1/2018 | Stromborg |
| D810,998 S | 2/2018 | Difelice |
| D812,806 S | 3/2018 | Luo |
| D819,861 S | 6/2018 | Scribante |
| 10,012,354 B2 | 7/2018 | Bernard |
| D830,604 S | 10/2018 | Watt |
| D833,663 S | 11/2018 | Stromborg |
| 10,240,760 B1 * | 3/2019 | Lehman .................. F21S 8/00 |
| 10,274,173 B2 | 4/2019 | Schubert |
| 10,400,992 B2 | 9/2019 | Kim |
| D862,787 S | 10/2019 | Rashidi |
| 2008/0232107 A1 | 9/2008 | Hsu |
| 2011/0029680 A1 | 12/2011 | Tsai |
| 2012/0140461 A1 | 6/2012 | Pickard |
| 2013/0294053 A1 | 11/2013 | Marquardt |
| 2014/0126195 A1 | 5/2014 | Dixon |
| 2015/0029709 A1 | 1/2015 | Lu et al. |
| 2015/0168636 A1 | 6/2015 | Holman et al. |
| 2015/0252982 A1 | 9/2015 | Demuynck |
| 2015/0378081 A1 | 12/2015 | Blessitt et al. |
| 2016/0377261 A1 | 12/2016 | Bernard |
| 2017/0263803 A1 | 9/2017 | Clements |

* cited by examiner

LIGHTING FIXTURE

PRIORITY CLAIM

The present application is based on and claims priority to U.S. Provisional App. No. 62/665,165, titled "Lighting Fixture," having a filing date of May 1, 2018, which is incorporated by reference herein. The present application is also based on and claims priority to U.S. Provisional App. No. 62/807,307, titled "Lighting Fixture," having a filing date of Feb. 19, 2019, which is also incorporated by reference herein.

FIELD

The present disclosure relates generally to lighting fixtures.

BACKGROUND

Lighting fixtures (e.g., luminaires) using light emitting diodes (LEDs) have in recent years become somewhat practical and continue to penetrate the lighting market due to the increased luminous efficacy of commercially available LED components. LED lighting fixtures are desirable as they offer customers energy savings due to good luminous efficacy combined with the ability to precisely control light distribution patterns.

SUMMARY

Aspects and advantages of embodiments of the present disclosure will be set forth in part in the following description, or may be learned from the description, or may be learned through practice of the embodiments.

One example aspect of the present disclosure is directed to a lighting fixture that includes at least one panel. The lighting fixture can further include at least one light source positioned adjacent an edge of the at least one panel to illuminate the at least one panel. The lighting fixture can be configured to redirect light out of the fixture at a location that is different than the panel.

Another example aspect of the present disclosure is directed to a lighting fixture that includes a first panel and a second panel. The first panel can include a plurality of surfaces and a first edge formed therebetween. The second panel can include a plurality of surfaces and a second edge formed therebetween. The lighting fixture can include a first set of one or more LEDs positioned adjacent to the first edge to illuminate the first panel. The lighting fixture can further include a second set of one or more LEDs positioned adjacent to the second edge to illuminate the second panel. The lighting fixture can include an illuminated surface positioned to receive light from at least one of the first panel and the second panel.

Yet another example aspect of the present disclosure is directed to a lighting fixture that includes a first panel and a second panel. The first panel can include a plurality of surfaces and a first edge formed therebetween. The second panel can include a plurality of surfaces and a second edge formed therebetween. The lighting fixture can include a first set of one or more LEDs positioned adjacent to the first edge to illuminate the first panel. The lighting fixture can further include a second set of one or more LEDs positioned adjacent to the second edge to illuminate the second panel. The lighting fixture can include a light reflector positioned to reflect light emitted from at least one of the first panel and the second panel. The lighting fixture further includes a third panel positioned to receive light reflected off of the light reflector.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
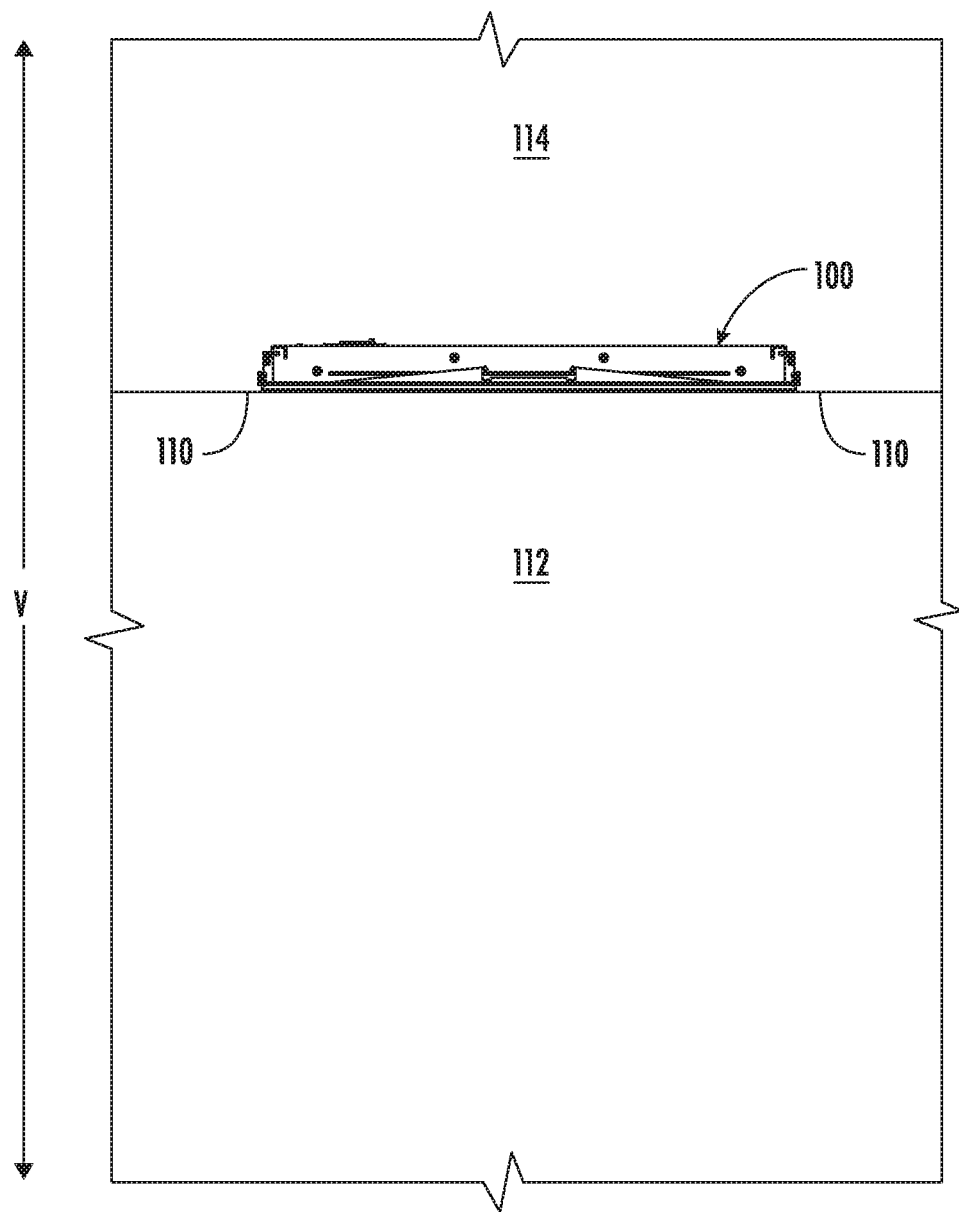
FIG. 1 depicts an environment having a lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a lighting fixture having at least one panel. In some implementations, the panel can include a light guide. The lighting fixture can include at least one light source positioned adjacent an edge of the panel. As an example, the at least one light source can include one set of light emitting diodes (LEDs). The lighting fixture can be configured to redirect light out of the lighting fixture at a location that is different than the panel.

In some implementations, the lighting fixture can include a first panel and a second panel spaced apart from the first panel along a lateral direction. More specifically, the first and second panels can be spaced apart from one another such that a gap is defined therebetween along the lateral direction. The first panel can include a plurality of surfaces and a first edge formed therebetween. The second panel can include a plurality of surfaces and a second edge formed therebetween.

In some implementations, the lighting fixture can include a first set of one or more LEDs and a second set of one or more LEDs. The first set of LEDs can be positioned adjacent the first edge to illuminate the first panel. The second set of LEDs can be positioned adjacent the second edge to illuminate the second panel. As will be discussed below in more detail, the lighting fixture can include an illuminated surface positioned to receive light from at least one of the first panel and the second panel.

In some implementations, the illuminated surface can include a light reflector configured to reflect light from at least one of the first panel and the second panel. The light reflector can extend adjacent a first surface of the first panel and a second surface of the second panel. In some implementations, the light reflector can contact the first surface of the first panel and the second surface of the second panel. In alternative implementations, the light reflector can be spaced apart from the first and second panels along a vertical direction. More specifically, a gap can be defined between the light reflector and the first and second panels. In some implementations, movement of the first and second panels along the vertical direction can be limited by the light reflector. In particular, movement can be fully or partially inhibited by the light reflector. For example, the first and second panels may be permitted to move along the vertical direction between the light reflector and a frame supporting both the first panel and the second panel. Nevertheless, after installation the panels can be restrained from downward movement by the frame and from upward movement due to gravity.

In some implementations, at least a portion of the light reflector can be positioned directly above a gap defined between the first panel and the second panel along a lateral direction. In this manner, light from at least one of the first panel and the second panel can reflect off of the at least a portion of the light reflector. In some implementations, the at least a portion of the light reflector can include a pattern. For instance, in some implementations the pattern can be associated with any suitable source (e.g., company, individual, sports team, etc.). In alternative implementations, the pattern can be associated with one or more surfaces (e.g., ceiling, floor, wall, etc.) of a room or area in which the lighting fixture is located.

Alternatively or additionally, the illuminated surface can include a third panel. In some implementations, the third panel can be positioned between the first panel and the second panel along the lateral direction. More specifically, the third panel can be positioned at a height below upper edges of both the first panel and the second panel along the vertical direction. In some implementations, the third panel can extend along the lateral direction between a first rail supporting the first panel and a second rail supporting the second panel. In some implementations, the third panel can be transparent or semi-transparent. As such, light reflected off the light reflector can pass through the third panel. In this manner, light emitted from the first and second set of LEDs can exit the light fixture at a location that is different than the first and second panels.

The lighting fixture of the present disclosure provides a number of technical benefits. For example, the illuminated surface allows the lighting fixture to repurpose light emitted from an emitting edge of at least one of the first panel and the second panel. More specifically light can be reflected off of the at least a portion of the illuminated surface positioned above the gap defined between the first and second panel along the vertical direction. In this manner, light can exit the lighting fixture at a location that is different than the first and second panel. More specifically, light can exit the lighting fixture via the gap defined between the first and second panels.

Another example aspect of the present disclosure is directed to a lighting fixture defining a lateral direction, a transverse direction, and a vertical direction. The lighting fixture can include at least one panel and at least one light source positioned adjacent an edge of the at least one panel to illuminate the at least one panel. The lighting fixture can be configured such that at least a portion of light emitted from the at least one light source exits the lighting fixture at a location that is different than the panel.

In some implementations, the edge is a first edge of the at least one panel. The lighting fixture can be configured such that a first portion of the light emitted from the at least one light source exits the lighting fixture from a first surface of the at least one panel. The lighting fixture can be further configured such that a second portion of the light emitted from the at least one light source exits a second edge of the at least one panel. The second portion of the light can exit the lighting fixture at a location that is different than the first edge, the second edge, and the first surface of the at least one panel.

In some implementations, the lighting fixture can further include at least one additional surface configured to redirect the second portion of the light from the second edge to the location that is different than the first edge, the second edge, and the first surface of the at least one panel.

In some implementations, the lighting fixture can further include a mixing chamber that is defined, at least in part, by the at least one additional surface. The mixing chamber can be configured to redirect the second portion of the light from the second edge of the at least one panel. In some implementations, the mixing chamber can be concave relative to a first plane extending in the lateral direction and the transverse direction. The first surface of the at least one panel can define a second plane that intersects the first plane. More specifically, the second plane can intersect the first plane such that the second plane is non-orthogonal with the first plane.

In some implementations, the at least one panel can include a first panel including the first surface and a second panel including a second surface that defines a third plane that intersects the first plane. More specifically, the third plane can be non-orthogonal with the first plane.

In some implementations, the at least one panel can include a first panel and a second panel. Additionally, the at least one light source can include a first light source and a second light source. The first light source can be positioned adjacent a first edge of the first panel. The second light source can be positioned adjacent a third edge of the second panel. In some implementations, the lighting fixture can include a mixing chamber configured to redirect light from a second edge of the first panel and a fourth edge of the second panel. More specifically, the mixing chamber can be configured to redirect the light from second edge and the fourth edge out of the lighting fixture.

In some implementations, a lighting fixture can include a panel and at least one light source positioned adjacent to an edge of the panel. The lighting fixture can further include at least one surface configured to redirect light from a second edge of the panel. The lighting fixture can be configured to redirect light out of the lighting fixture at a location that is different than the panel.

In some implementations, a lighting fixture can include a panel and at least one light surface positioned adjacent to a first edge of the panel. In addition, the lighting fixture can include at least one surface configured to redirect light from a second edge of the panel. In some implementations, the lighting fixture can include a second panel and at least one light source positioned adjacent to a third edge of the second panel. Furthermore, the at least one surface can be configured to redirect light from a fourth edge of the second panel.

In some implementations, the lighting fixture can include a mixing chamber that is defined, at least in part, by the at least one surface. The mixing chamber can be configured to provide redirected light from the second edge of the first panel and the fourth edge of the second panel.

In some implementations, a lighting fixture can include a first panel and a second panel. The first panel can include a plurality of surfaces and a first edge formed therebetween. The second panel can include a plurality of surfaces and a second edge formed therebetween. The lighting fixture can include a first set of one or more LEDs positioned adjacent to the first edge to illuminate the first panel. The lighting fixture can further include a second set of one or more LEDs positioned adjacent to the second edge to illuminate the second panel. The lighting fixture can include an illuminated surface positioned to receive light from at least one of the first panel and the second panel.

In some implementations, the illuminated surface can include a third panel. The third panel can include a baffle defining one or more slots. In some implementations, the illuminated surface can include a light reflector configured to reflect light from at least one of the first panel and the second panel. The lighting reflector can, in some implementations, extend adjacent a first surface of the first panel and a second surface of the second panel. Alternatively or additionally, the lighting fixture can include a third panel in addition to the light reflector. For example, the third panel can be a baffle defining one or more slots.

In some implementations, the lighting fixture can include a frame configured to accommodate the first panel, the second panel, and the illuminated surface. The frame can define a first plane. An upper surface of the first panel can define a second plane that intersects the first plane at an angle. Furthermore, an upper surface of the second panel can define a third plane that intersects the first plane at an angle. In some implementations, the illuminated surface can define a fourth plane that is parallel with the first plane.

As used herein, a "lighting fixture" refers to a device used to provide light or illumination using one or more light sources. In addition, the terms "first" and "second" may be used interchangeably to distinguish one component from another and are not intended to signify location or importance of the individual components.

Referring now to the figures, FIG. 1 depicts a lighting fixture 100 according to an example embodiment of the present disclosure. In some implementations, the lighting fixture 100 can be removably mounted to a ceiling 110 that separates separate a first space 112 (e.g., positioned beneath the ceiling 110) from a second space 114 (e.g., positioned above the ceiling 110) along a vertical direction V. More specifically, at least a portion of the lighting fixture 100 can be recessed within an opening defined by the ceiling 110. In some implementations, the lighting fixture can be installed in a standard drop-ceiling frame. It should be appreciated that the lighting fixture can be implemented in any suitable size. For instance, the lighting fixture 100 can have a standard 1 foot (ft) by 1 foot dimension, 2 ft by 2 ft dimension, 2 ft by 4 ft dimension or any other desired dimension according to a desired implementation. In some implementations, a single lighting fixture 100 may be installed in either a narrow-guide ceiling frame or a standard-guide ceiling frame. For instance, the frame of the lighting fixture 100 can be attached directly to some ceiling frames, while a connector may be used to attach the frame of the lighting fixture 100 to other ceiling frames.

Figure 2:
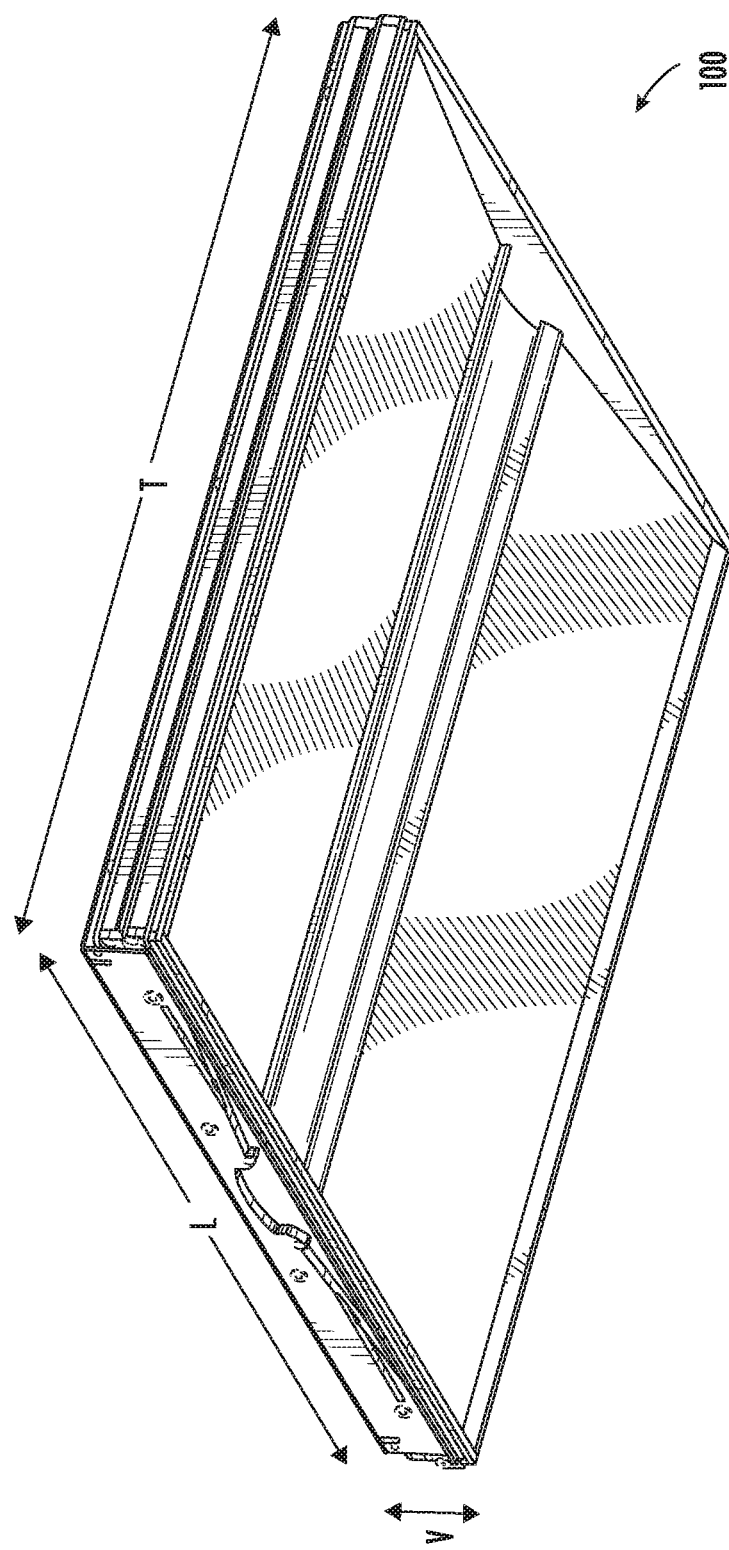
FIG. 2 depicts a bottom perspective view of a lighting fixture according to example embodiments of the present disclosure.
Figure 3:
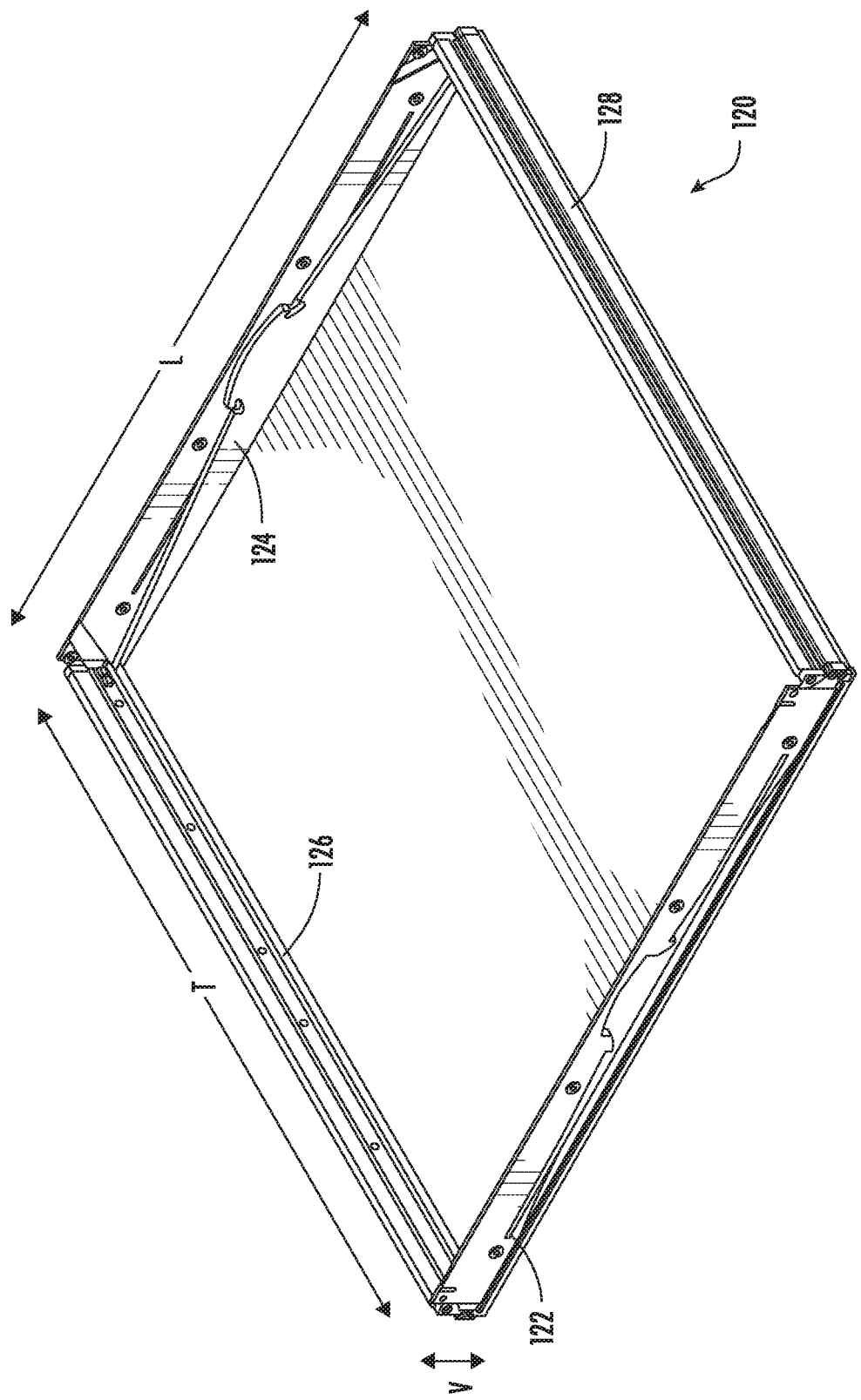
FIG. 3 depicts a frame of a lighting fixture according to example embodiments of the present disclosure.
Figure 4:
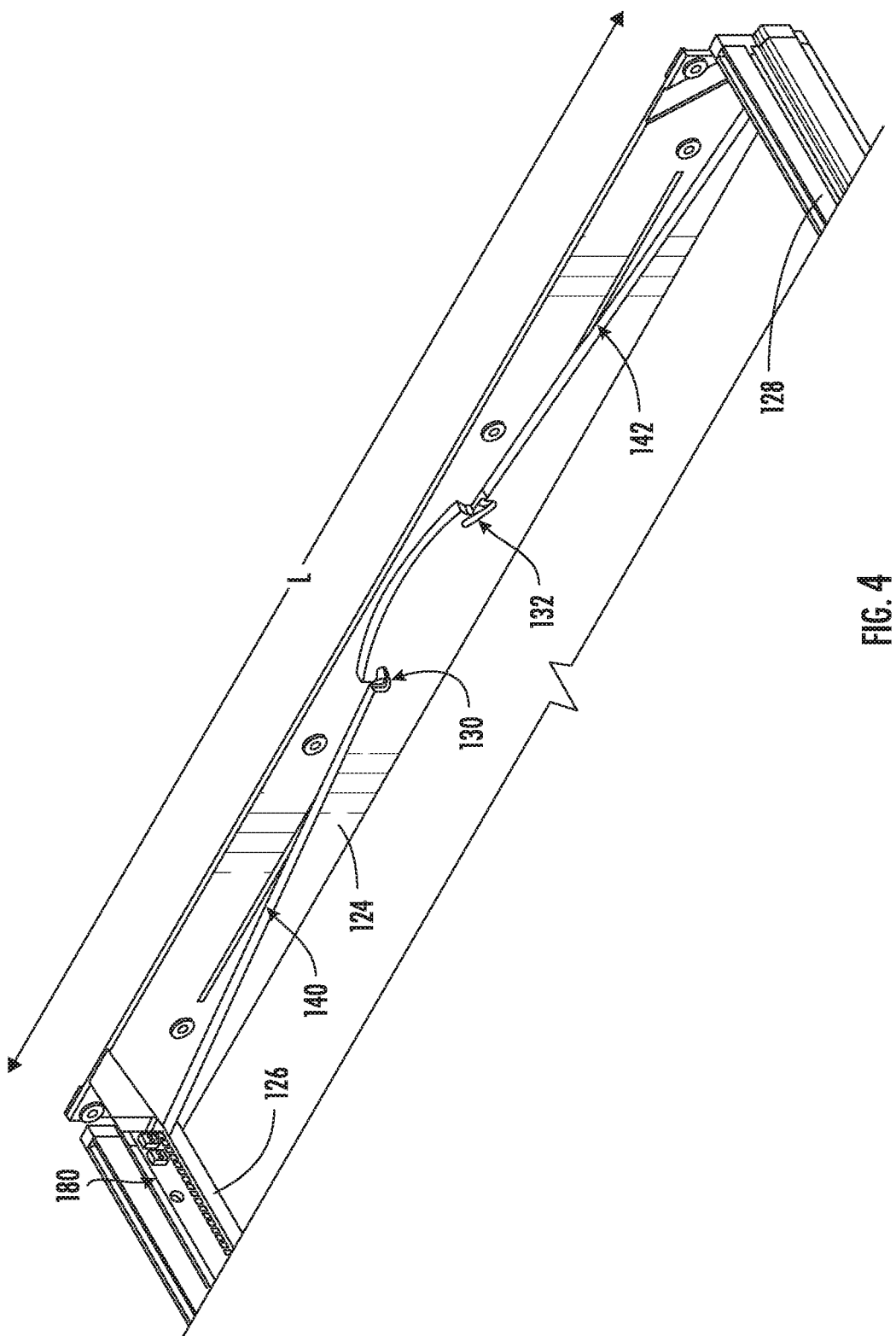
FIG. 4 depicts a portion of the frame depicted in FIG. 3.

Referring now to FIGS. 2 through 4, the lighting fixture 100 defines a lateral direction L, a transverse direction T, and a vertical direction V. The lighting fixture 100 can include a frame 120. In some implementations, the frame 120 can include a first end 122 and a second end 124 spaced apart from the first end 122 along the transverse direction T. Additionally, the frame 120 can include a first side 126 and a second side 128 spaced apart from the first side 126 along the lateral direction L. The first side 126 and the second side 128 can, as shown, each extend along the transverse direction T between the first and second ends 122, 124. In some embodiments, the first side 126 and the second side 128 can each be fastened to the first end 122 and the second end 124 via one or more fasteners. For instance, the sides 126, 128 and ends 122, 124 can be secured to one another via a plurality of screws. More specifically, the plurality of screws can include self-tapping screws. In some implementations, the frame 120, including the sides 126, 128 and ends 122, 124, may be formed as a single component. Any type, number, and/or combination of components may be used to fabricate the sides and ends.

In some implementations, the first end 122 and the second end 124 can each define a first notch 130 and a second notch 132. As shown, the first notch 130 and the second notch 132 can be spaced apart from one another along the lateral direction L. Alternatively or additionally, the first end 122 and the second end 124 can each include a first projection 140 and a second projection 142. In some implementations, the first projection 140 can extend along the lateral direction L between the first notch 130 and the first side 126 of the frame 120. The second projection 142 can, as shown, extend along the lateral direction L between the second notch 132 and the second side 128 of the frame 120.

In some implementations, the first projection 140 can be sloped. For instance, a portion of the first projection 140 adjacent to the first notch 130 can be spaced apart from a portion of the first projection 140 adjacent to the first side 126 along the vertical direction V. More specifically, the portion adjacent the first notch 130 can be positioned above the portion adjacent the first side 126. In this manner, the first projection 140 can slope downward along the lateral direction L between the first notch 130 and the first side 126.

Alternatively or additionally, the second projection 142 can be sloped. For instance, a portion of the second projection 142 adjacent to the second notch 132 can be spaced apart from a portion of the second projection 142 adjacent to the second side 128 along the vertical direction V. More specifically, the portion adjacent the second notch 132 can be positioned above the portion adjacent the second side 128. In this manner, the second projection 142 can slope downward along the lateral direction L between the second notch 132 and the second side 128

Figure 5:
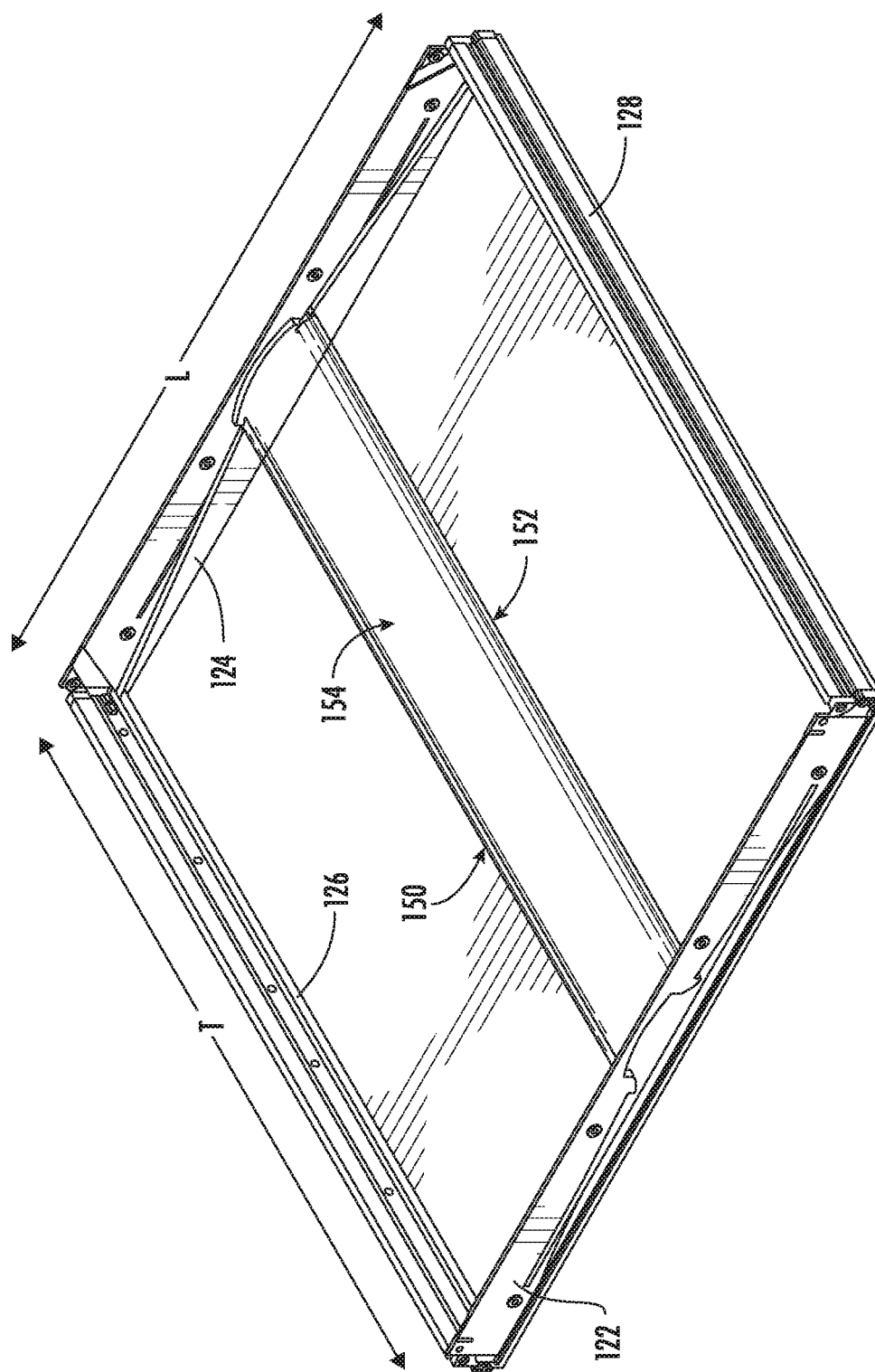
FIG. 5 depicts the frame of FIG. 3 supporting a pair of rails according to example embodiments of the present disclosure.

Referring now to FIG. 5, the lighting fixture 100 can include a first rail 150 and a second rail 152. In some implementations, the first and second rails 150, 152 can be removably coupled to the frame 120 via one or more fasteners, such as screws. More specifically, the first rail 150 and the second rail 152 can each be removably coupled to the first and second ends 122, 124 of the frame 120. In some implementations, at least a portion of the first rail 150 can be retained within the first notch 130. Alternatively or additionally, at least a portion of the second rail 152 can be retained within the second notch 132. When the first rail 150 and the second rail 152 are each removably coupled to the frame 120, the first rail 150 and the second rail 152 can, as shown, extend along the transverse direction T from the first end 122 of the frame 120 to the second end 124 of the frame 120. In addition, the first rail 150 and the second rail 152 can, as shown, be spaced apart from one another along the lateral direction L. In this manner, a gap 154 can be defined between the first rail 150 and the second rail 152 along the lateral direction L. As will be discussed below in more detail, the first rail 150 and second rail 152 can support one or more panels of the lighting fixture 100.

Figure 6:
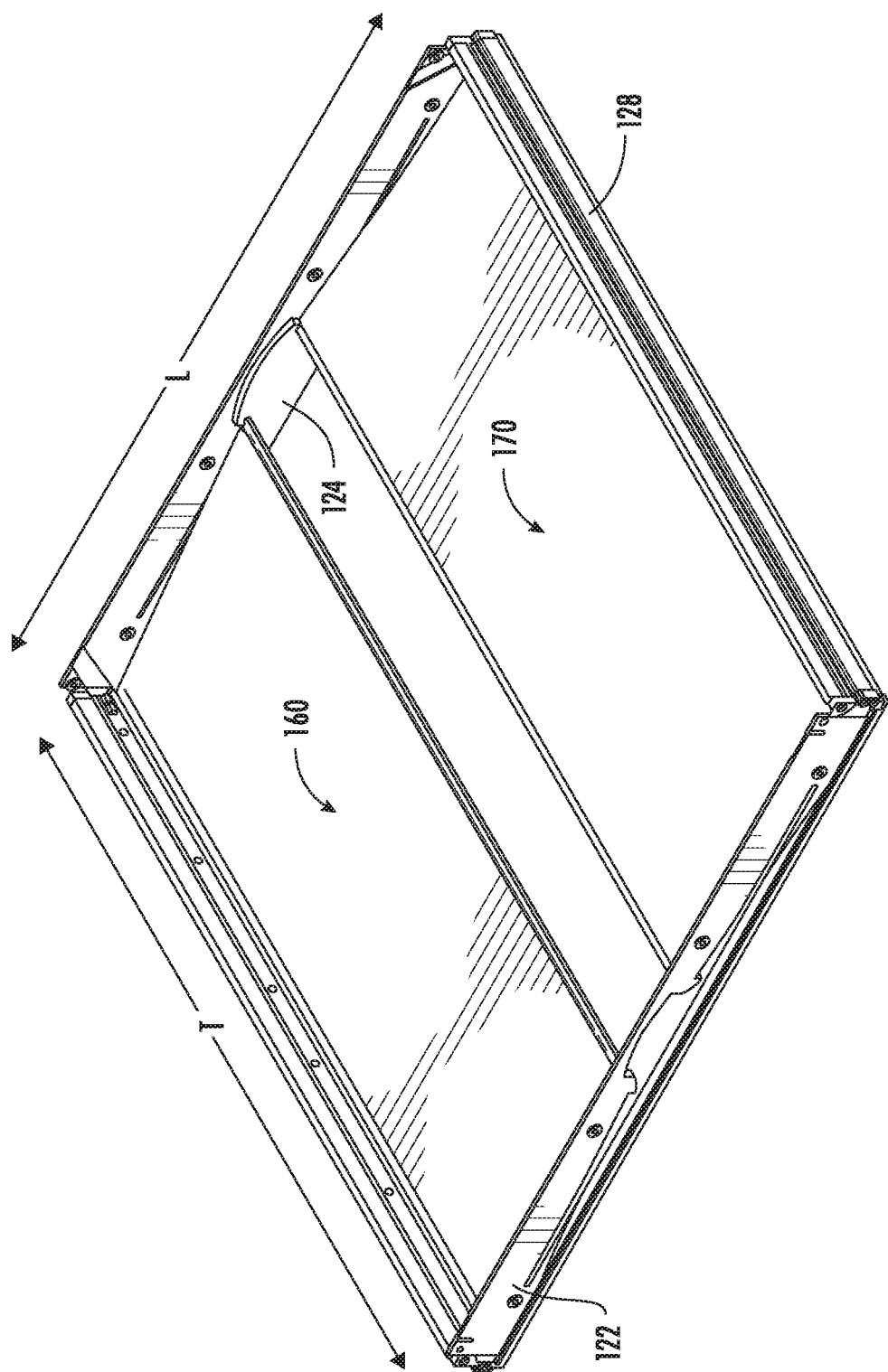
FIG. 6 depicts the frame of FIG. 3 supporting a pair of panels according to example embodiments of the present disclosure.
Figure 7:
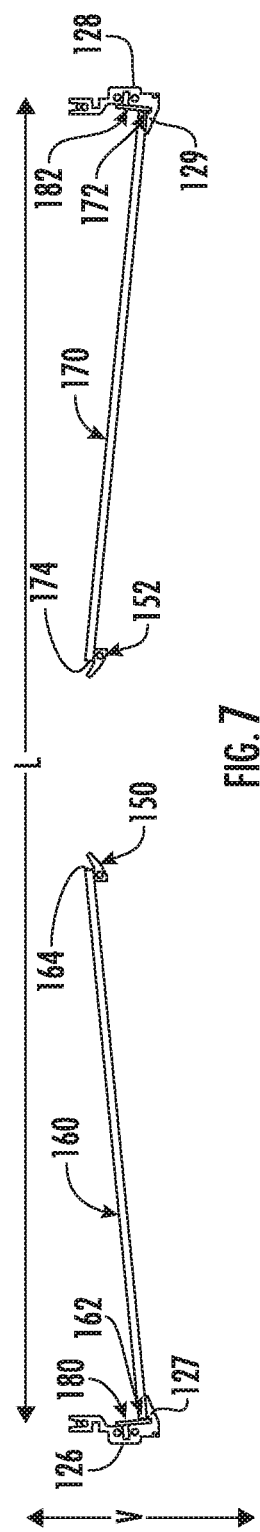
FIG. 7 depicts a cross-sectional view of FIG. 6 according to example embodiments of the present disclosure.
Figure 8:
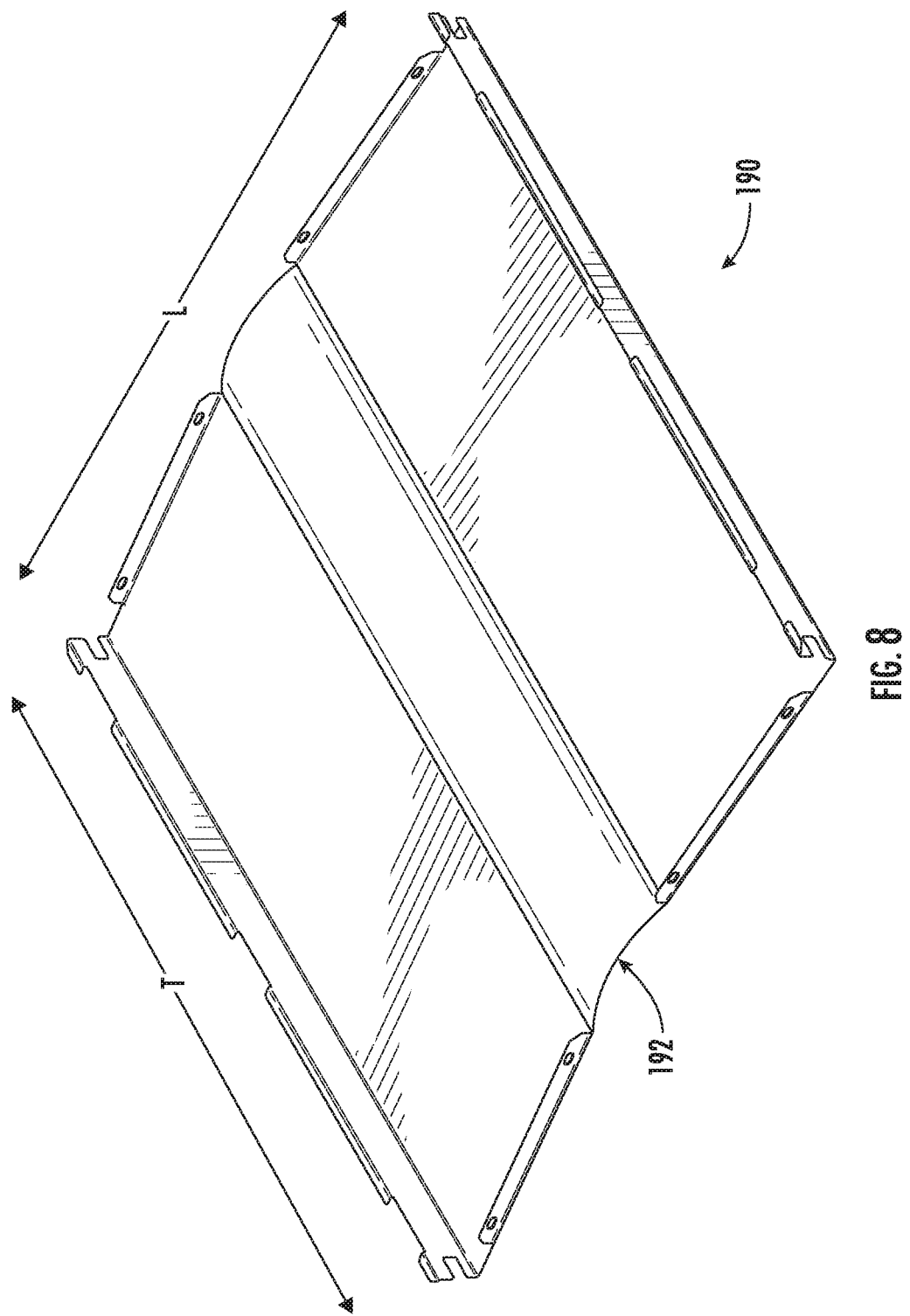
FIG. 8 depicts an illuminated surface of a lighting fixture according to example embodiments of the present disclosure.
Figure 9:
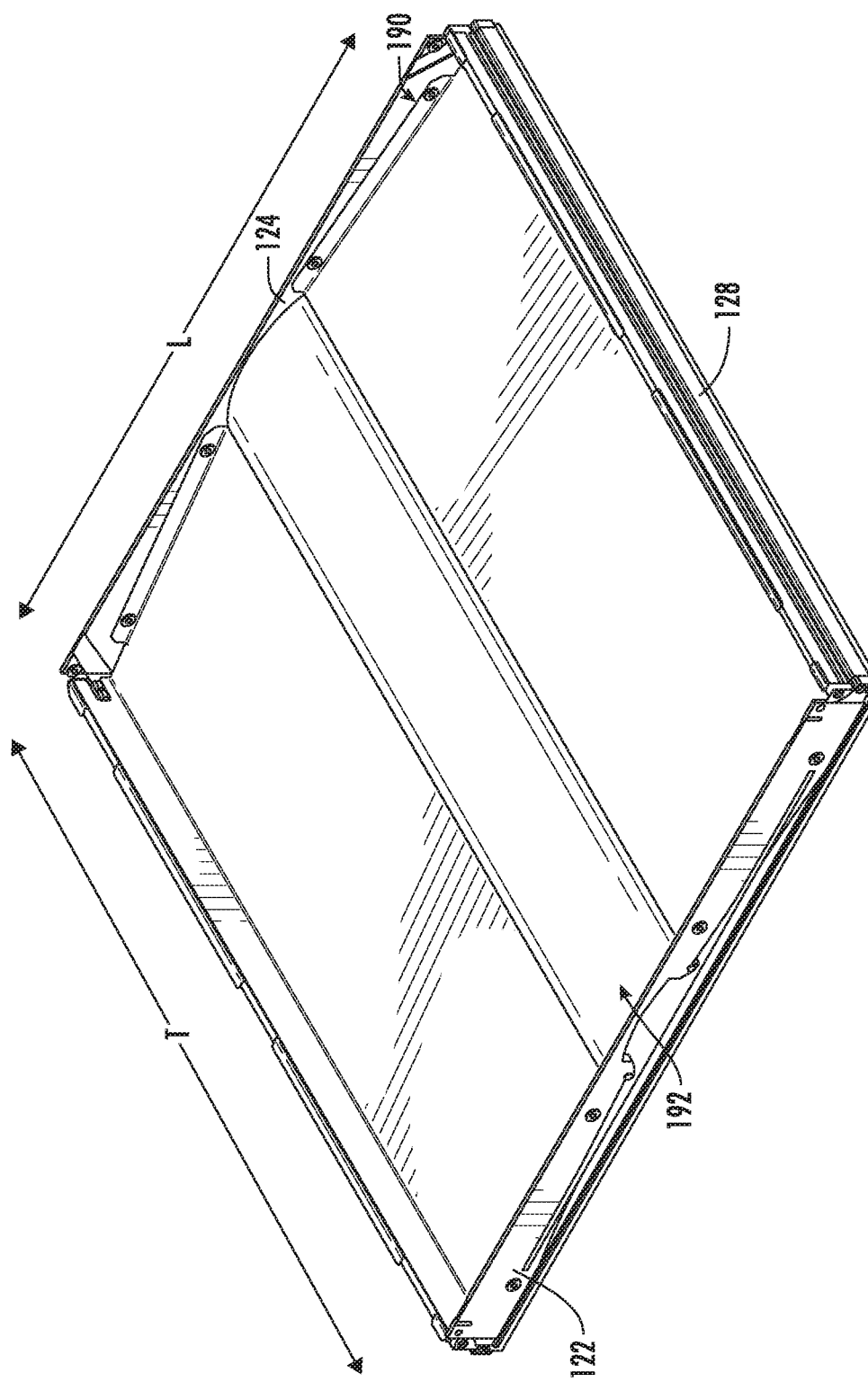
FIG. 9 depicts a perspective view of the illuminated surface of FIG. 8 mounted to the frame of FIG. 3 according to example embodiments of the present disclosure.
Figure 10:
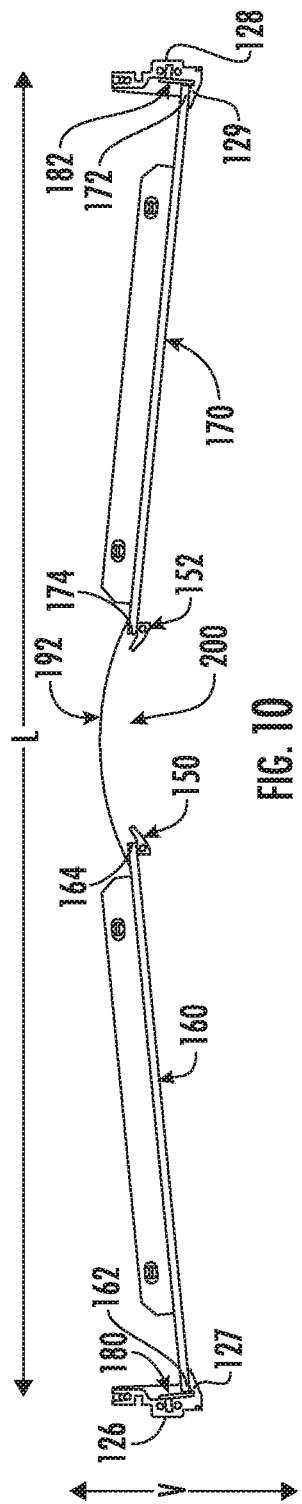
FIG. 10 depicts a cross-sectional view of FIG. 9 according to example embodiments of the present disclosure.
Figure 11:
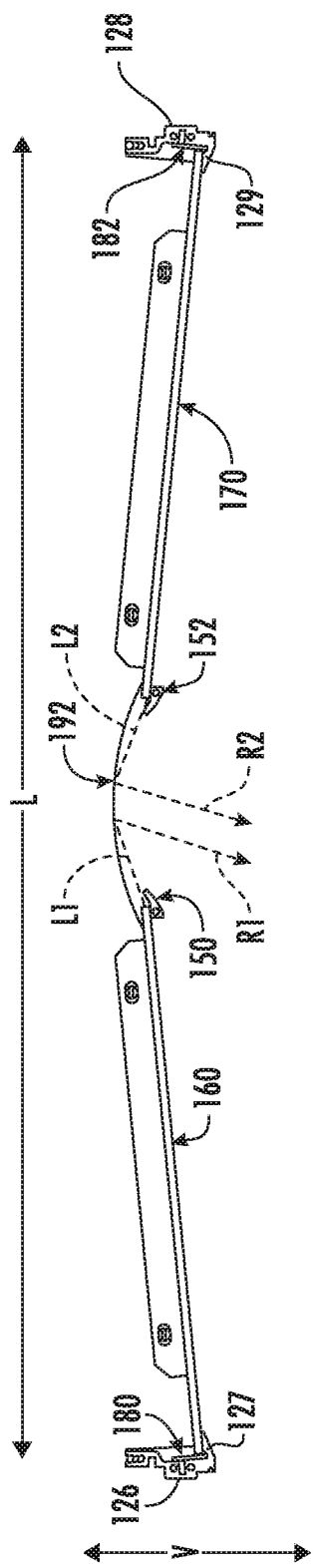
FIG. 11 depicts another cross-sectional view of FIG. 9 according to example embodiments of the present disclosure.

Referring now to FIGS. 6 and 7, the lighting fixture 100 (FIG. 1) can include a first panel 160. The first panel 160 can include a plurality of surfaces (e.g., a front surface and a rear surface) and at least one edge formed therebetween. As shown, the first panel 160 can extend along both the lateral direction L and the transverse direction T. More specifically, the first panel 160 can extend along the lateral direction L between the first rail 150 and the first side 126 of the frame 120. Additionally, the first panel 160 can extend along the transverse direction T between the first end 122 of the frame 120 and the second end 124 of the frame 120. In some implementations, the first panel 160 can be supported, at least in part, by the first projection 140 (FIG. 4) of the first end 122 of the frame 120 and the first projection 140 of the second end 124 of the frame 120.

Alternatively or additionally, the first panel 160 can be supported, at least in part, by the first rail 150 and the first side 126 of the frame 120. In some implementations, the first panel 160 can rest on a lip 127 of the first side 126. The lip 127 can, in some implementations, be spaced apart from the first rail 150 along the vertical direction V. More specifically, the lip 127 can be positioned below the first rail 150 along the vertical direction V. In this manner, a plane defined by the first panel 160 can intersect a plane defined by the frame 120 at an angle. In some implementations, the lip 127 is integrally formed with the first side 126. In other embodiments, however, the lip 127 can be a separate component that is attachable to the first side 126 of the frame 120.

Still referring to FIGS. 6 and 7, the lighting fixture 100 can, as shown, include a second panel 170 spaced apart from the first panel 160 along the lateral direction L. The second panel 170 can include a plurality of surfaces (e.g., a front surface and a rear surface) and at least one edge formed therebetween. As shown, the second panel 170 can extend along both the lateral direction L and the transverse direction T. More specifically, the second panel 170 can extend along the lateral direction L between the second rail 152 and the second side 128 of the frame 120. Additionally, the second panel 170 can extend along the transverse direction T between the first end 122 of the frame 120 and the second end 124 of the frame 120. In some implementations, the second panel 170 can be supported, at least in part, by the second projection 142 (FIG. 4) of the first end 122 of the frame 120 and the second projection 142 of the second end 124 of the frame 120.

Alternatively or additionally, the second panel 170 can be supported, at least in part, by the second rail 152 and the second side 128 of the frame 120. In some implementations, the second panel 170 can rest on a lip 129 of the second side 128. The lip 129 can, in some implementations, be spaced apart from the second rail 152 along the vertical direction V. More specifically, the lip 129 can be positioned below the second rail 152 along the vertical direction V. In this manner, a plane defined by the second panel 170 can intersect a plane defined by the frame 120 at an angle. In some embodiments, the lip 129 is integrally formed with the first side 126. In other embodiments, however, the lip 129 can be a separate component that is attachable to the second side 128 of the frame 120.

In some implementations, the first panel 160 can include a first light guide having a receiving edge 162 and an emitting edge 164. The receiving edge 162 of the first light guide can be positioned adjacent a first light source 180 of the lighting fixture 100. It should be appreciated that the receiving edge 162 of the first light guide is positioned adjacent the first light source 180 such that light emitted from the first light source 180 illuminates the receiving edge 162 of the first light guide. In some implementations, the first light source 180 can be coupled to the first rail 150. In alternative implementations, the first light source 180 can be coupled to the first side 126 of the frame 120. In such implementations, the receiving edge 162 can be positioned adjacent the first side 126. In this manner, the first light guide can, as will be discussed below in more detail, be illuminated via the first light source 180.

When the first light source 180 is active (e.g., powered on), at least a portion of light emitted from the first light source 180 can enter the first light guide via the receiving edge 162. In some implementations, the first light guide is etched to transmit light from the receiving edge 162 to the emitting edge 164. In some implementations, the emitting edge 164 of the first light guide can be positioned adjacent the first rail 150. In this manner, light emitted via the emitting edge 164 of the first light guide can be emitted adjacent the first rail 150.

In some implementations, the second panel 170 can include a second light guide having a receiving edge 172 and an emitting edge 174. The receiving edge 172 of the second light guide can be positioned adjacent a second light source 182 of the lighting fixture 100. It should be appreciated that the receiving edge 172 of the second light guide is positioned adjacent the second light source 182 such that light emitted from the second light source 182 illuminates the receiving edge 172 of the second light guide. In some implementations, the second light source 182 can be coupled to the second rail 152. In alternative implementations, the second light source 182 can be coupled to the second side 128 of the frame 120. In such implementations, the receiving edge 172 can be positioned adjacent the second side 128. In this manner, the second light guide can, as will be discussed below in more detail, be illuminated via the second light source 182.

When the second light source 182 is active (e.g., powered on), at least a portion of light emitted from the second light source 182 can enter the second light guide via the receiving edge 172. In some embodiments, the second light guide is etched to transmit light from the receiving edge 172 to the emitting edge 174. In some implementations, the emitting edge 174 of the second light guide can be positioned adjacent the second rail 152. In this manner, light emitted via the emitting edge 174 of the second light guide can be emitted adjacent the second rail 152.

It should be appreciated that the first light source 180 and the second light source 182 can each include any suitable light source. For instances, the first light source 180 can include a first set of one or more LEDs, and the second light source 182 can include a second set of one or more LEDs. Alternatively, the first light source 180 can include a first set of one or more fluorescent light sources, and the second light source 182 can include a second set of one or more fluorescent light sources.

As mentioned above, the first light source 180 and the second light source 182 can be positioned adjacent the first rail 150 and the second rail 152, respectively. In some implementations, the first light source 180 and the second light source 182 can be positioned on a same circuit board. More specifically, a first edge or portion of the circuit board can include a first set one or more LEDs associated with the first light source 180. Additionally, a second edge or portion of the circuit board can include a second set of one or more LEDs associated with the second light source 182.

In some implementations, the first rail 150 and the second rail 152 can each be angled relative to a plane defined by a rear surface of the first light guide and the second light guide, respectively. As will be discussed below in more detail, the first rail 150 and the second rail 152 can each be angled relative to the plane to direct light towards an illuminated surface of the lighting fixture 100.

Referring now to FIGS. 8 through 11, the lighting fixture 100 can include an illuminated surface 190. As shown, the illuminated surface 190 can include a light reflector configured to reflect light emitted from at least one of the first panel 160 and the second panel 170. The light reflector can extend adjacent a first surface of the first panel 160 and a second surface of the second panel 170. In some embodiments, the light reflector can reflect light emitted from the emitting edge 164 (FIG. 7) of the first light guide 160. Alternatively or additionally, the light reflector can reflect light emitted from the emitting edge 174 (FIG. 7) of the second light guide 170.

In some embodiments, the light reflector is configured to restrain or limit movement of both the first panel 160 and the second panel 170 along the vertical direction V. For instance, the light reflector can contact a first surface of the first panel 160 and a second surface of the second panel 170. More specifically, the first surface can include a rear surface of the first panel 160, and the second surface can include a rear surface of the second panel 170. In this manner, the light reflector can restrain movement of the both the first panel 160 and the second panel 170 along the vertical direction V. Alternatively, the light reflector can be spaced apart from the first panel 160 and the second panel 170 along the vertical direction V such that a gap is defined therebetween. For instance, the light reflector can be spaced apart from the first panel 160 and the second panel 170 such that about a 2 millimeter (mm) gap is defined therebetween. In this manner, the first panel 160 and the second panel 170 can each move along the vertical direction V between the frame 120 and the light reflector, but such movement can be limited.

In some implementations, at least a portion 192 of the light reflector extends in the lateral direction L at a height above a highest point of the first panel 160 and a highest point of the second panel 170. More specifically, the at least a portion 192 of the light reflector can extend in the lateral direction L between the emitting edge 164 of the first panel 160 and the emitting edge 174 of the second panel 170. In some implementations, the at least a portion 192 of the light reflector can be positioned directly above the gap 154 (FIG. 5) defined between the first rail 150 and the second rail 152 along the lateral direction L. As will be discussed below in more detail, light reflecting off of the light reflector can illuminate the gap 154.

In some implementations, the at least a portion 192 of the light reflector can be curved. More specifically, the at least a portion 192 of the light reflector can be concave. In this manner, light reflected off of the at least a portion 192 of the light reflector can be spread out along at least the lateral direction L.

In some implementations, the lighting fixture 100 can define a mixing chamber or integrating cavity 200. More specifically, the integrating cavity 200 can be defined, at least in part, along the lateral direction L between the emitting edge 164 of the first panel 160 and the emitting edge 174 of the second panel 170. Additionally, the integrating cavity 200 can be defined, at least in part, along the vertical direction V between the at least a portion 192 of the light reflector and the emitting edge 164, 174 of the first and second panels 160, 170, respectively.

As shown, a first ray L1 of light exiting the first panel 160 via the emitting edge 164 thereof can reflect off of the at least a portion 192 of the light reflector and exit the lighting fixture 100 as a first reflected ray R1 of light. More specifically, the first reflected ray R1 of light can exit the lighting fixture 100 at a location different than the first panel 160. Alternatively or additionally, a second ray of L1 of light exiting the second panel 170 via the emitting edge 174 thereof can reflect off of the at least a portion 192 of the light reflector and exit the lighting fixture 100 as a second reflected ray R2 of light. More specifically, the second reflected ray R2 of light can exit the lighting fixture 100 at a location different than the second panel 170. In some embodiments, the location that is different than the first and second panels 160, 170 can be the gap 154 (FIG. 5) defined between the first and second rails 150, 152 along the lateral direction L.

Figure 12:
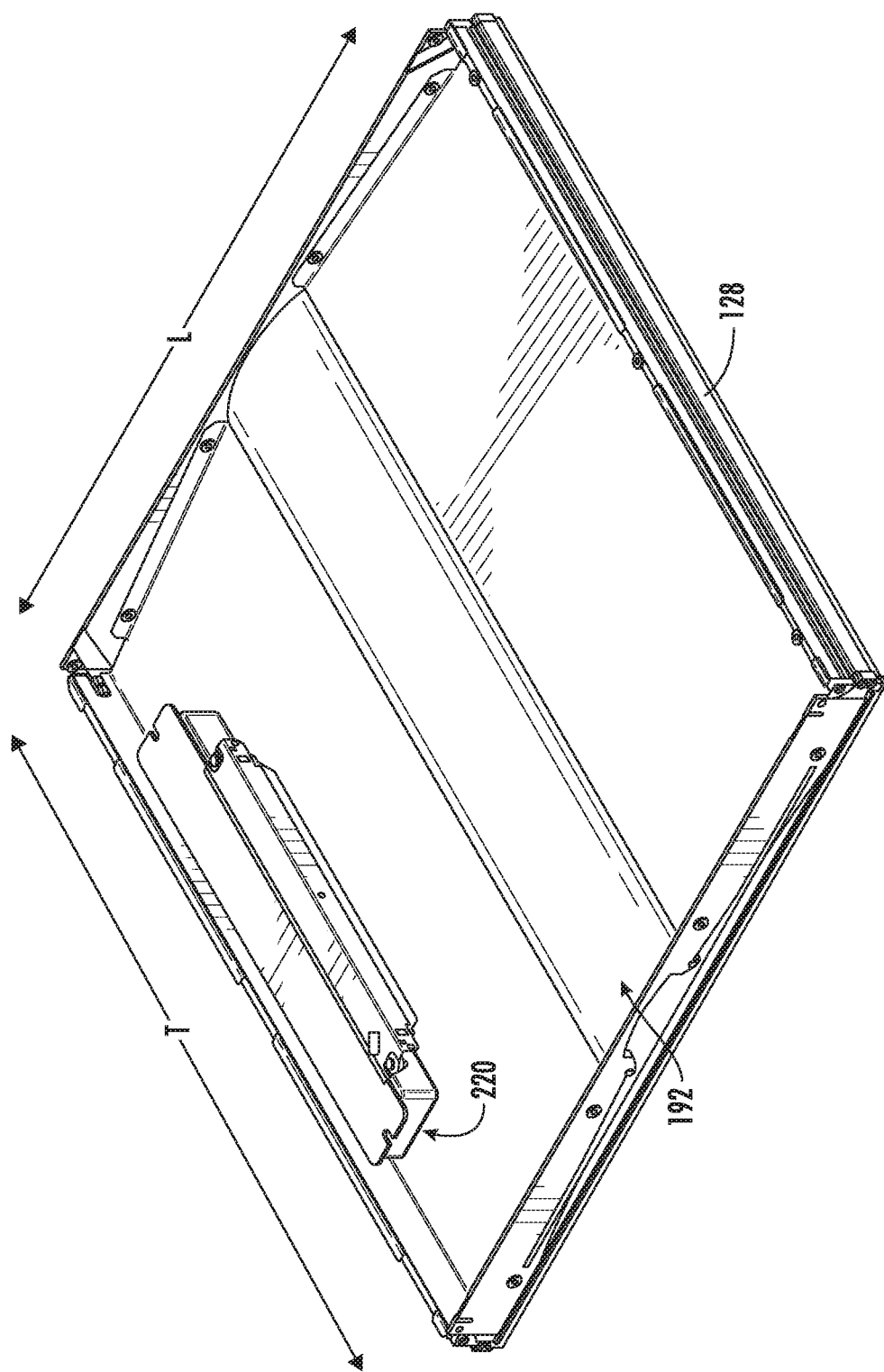
FIG. 12 depicts electrical components of the lighting fixture of FIG. 2 according to example embodiments of the present disclosure.
Figure 13:
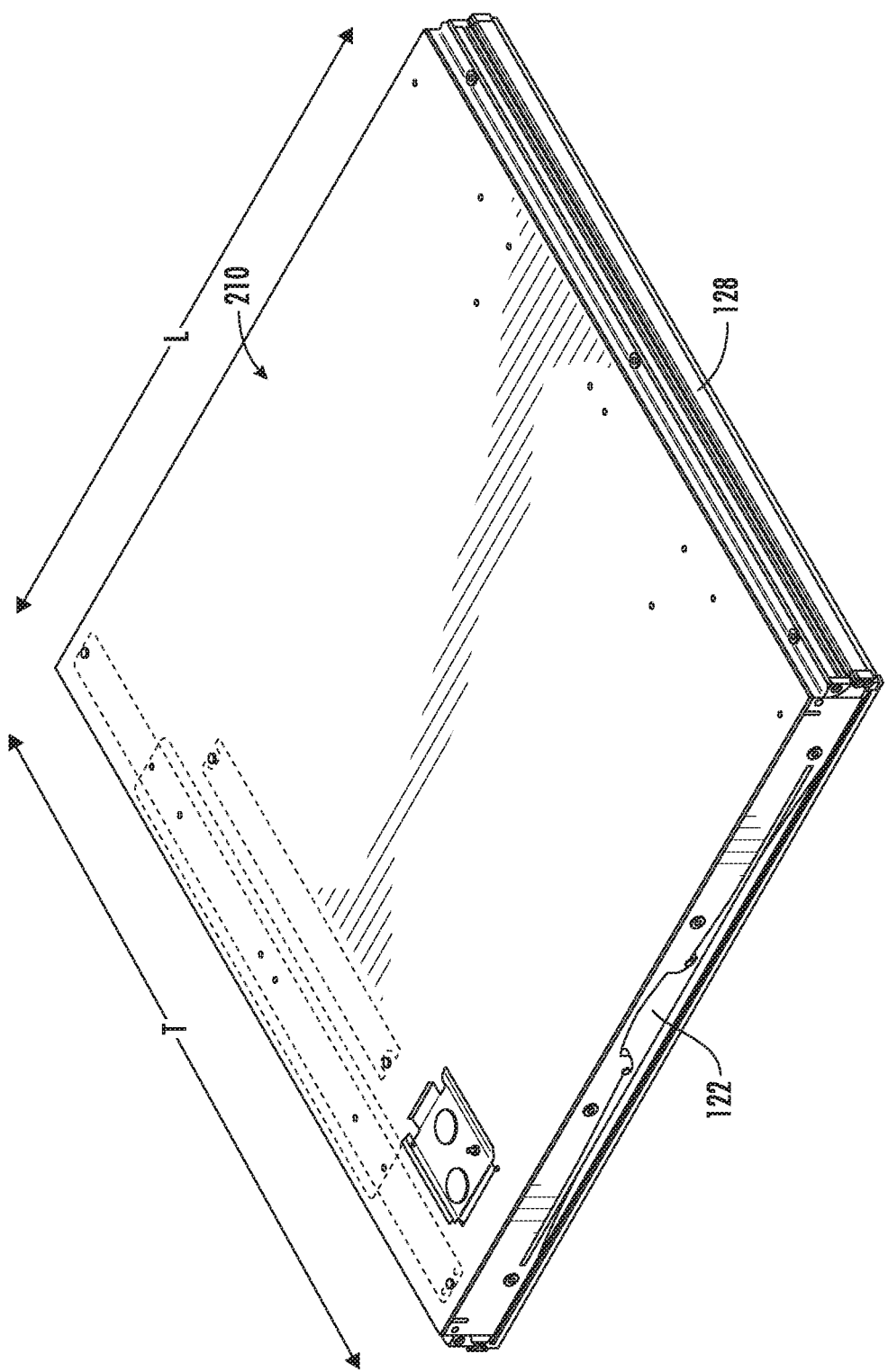
FIG. 13 depicts a top-perspective view of the lighting fixture of FIG. 2.

Referring now to FIGS. 12 and 13 in combination, the light fixture 100 can include one or more electrical components 220 positioned between the light reflector 190 and a top portion 210 of the frame 120. In some implementations, the one or more electrical components 220 can be removably coupled to the top portion 210 of the frame 120 via one or more fasteners. For instance, the one or more electrical components 220 can include an energy storage device, such as a battery. Alternatively or additionally, the one or more electrical components can include a driver for at least one of the first light source 180 (FIG. 7) and the second light source 182 (FIG. 7). More specifically, the driver can be an LED driver. In some implementations, the one or more electrical components 220 can be positioned between the frame 120 and the light reflector along the vertical direction V.

Figure 14:
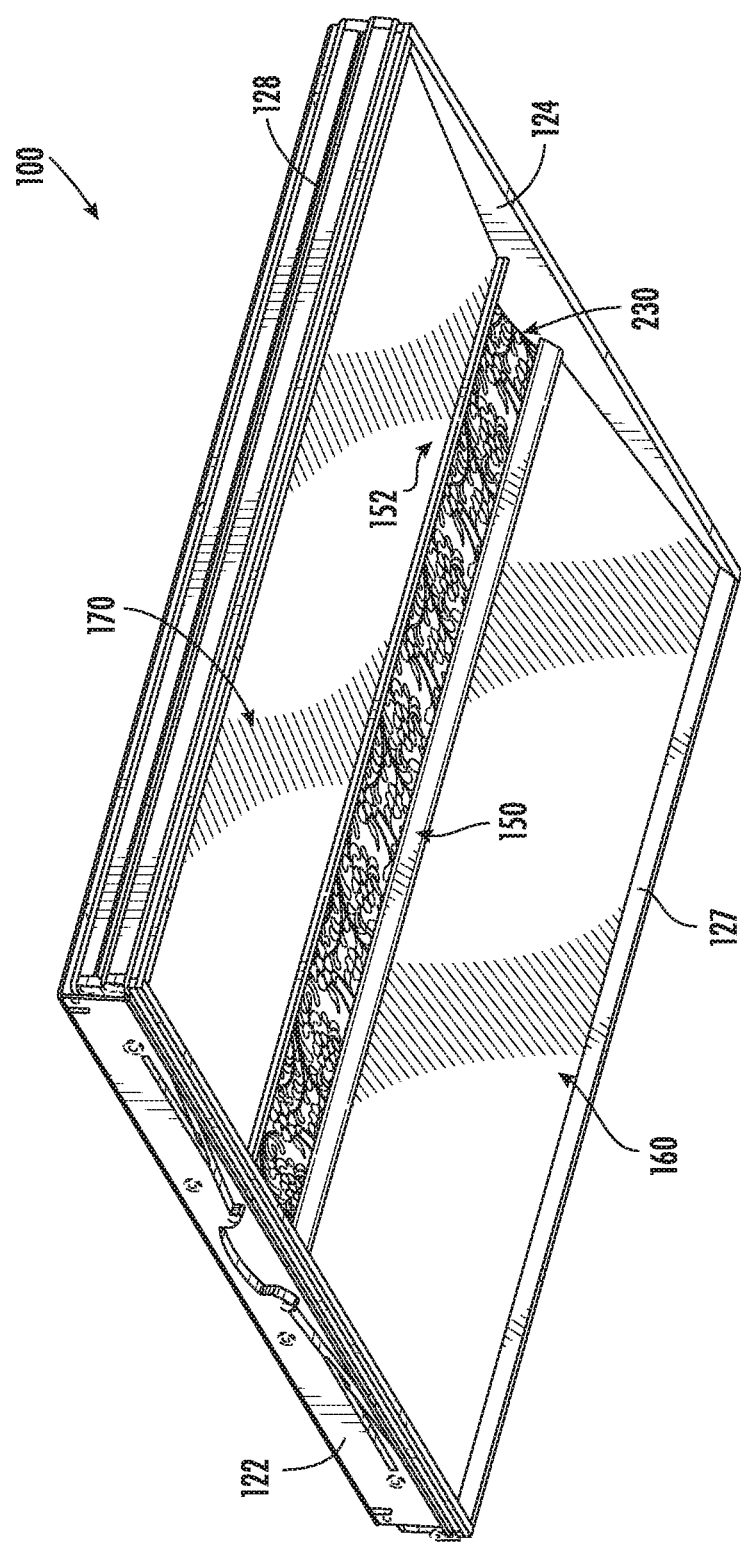
FIG. 14 depicts a bottom-perspective view of a lighting fixture according to example embodiments of the present disclosure.

Referring now to FIG. 14, at least a portion of the light reflector can include a patterned surface 230. For instance, as shown, the at least a portion 192 (FIG. 8) of the light reflector that is visible through the gap 154 (FIG. 5) defined between the first rail 150 and the second rail 152 can include a patterned surface 230. It should be appreciated that the patterned surface 230 depicted in FIG. 14 is illustrative of one example of a patterned surface that can be used for the light reflector. As will be discussed below in more detail, the patterned surface 230 can be customized based on user-preferences.

In some implementations, the patterned surface 230 can correspond to a pattern of wallpaper used on one or more walls of the room or area in which the lighting fixture 100 is located. Alternatively, the patterned surface 230 can correspond to the pattern of the flooring (e.g., hardwood, tile, laminate, linoleum, vinyl, etc.) used in the room or area. In some implementations, the patterned surface 230 can correspond to the pattern of the ceiling in the room or area. It should be appreciated, however, that the patterned surface 230 can correspond to the pattern of any suitable surface of the room or area in which the lighting fixture 100 is located.

In some implementations, the patterned surface 230 can include one or more logos. For instance, the one or more logos can be associated with a sports team (e.g., football, basketball, baseball, etc.). Alternatively, the one or more logos can be associated with a company or individual. It should be appreciated, however, that the one or more logos can be associated with any suitable source (e.g., company, sports team, individual).

Figure 15:
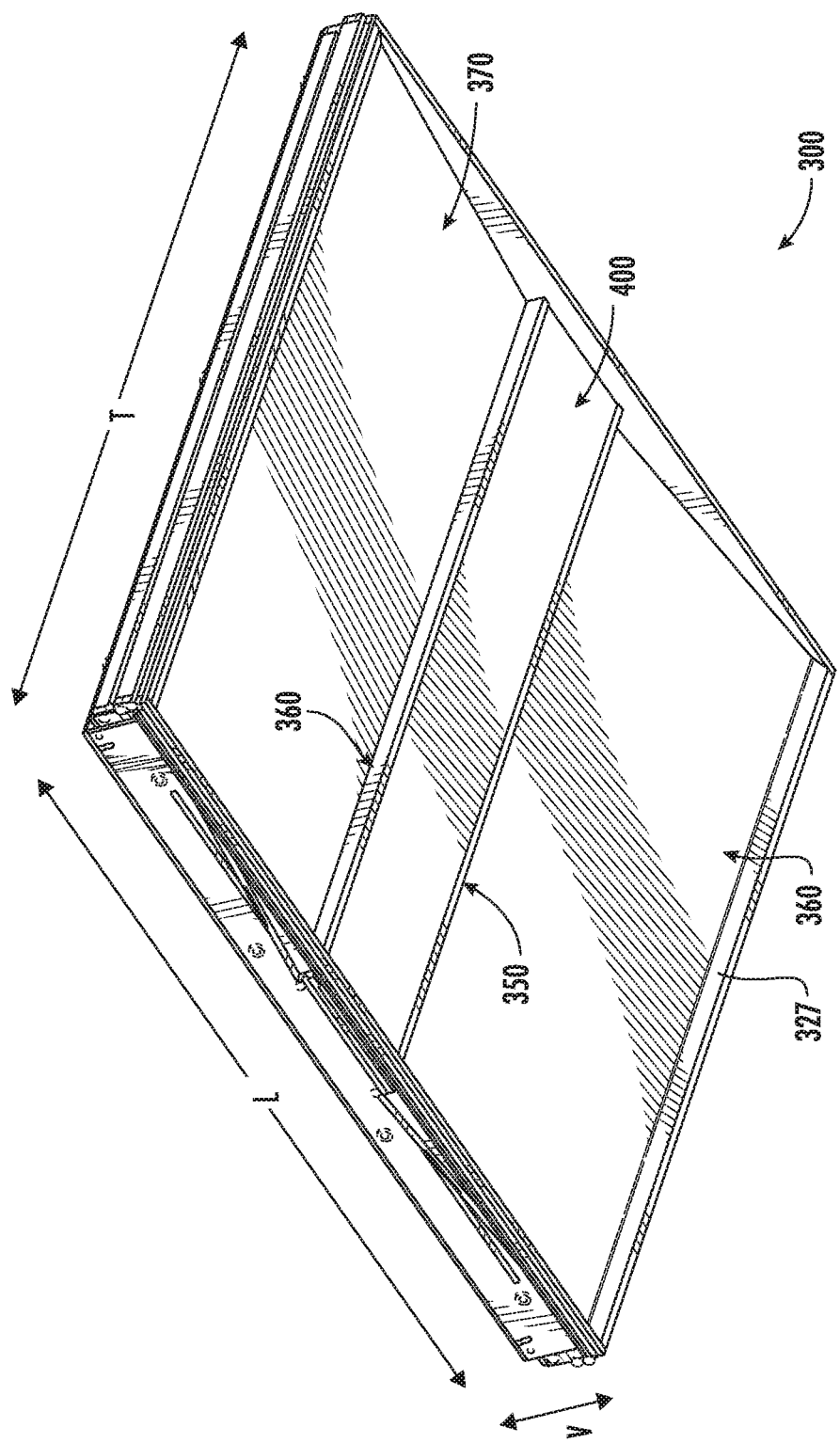
FIG. 15 depicts a bottom-perspective view of a lighting fixture according to example embodiments of the present disclosure.
Figure 16:
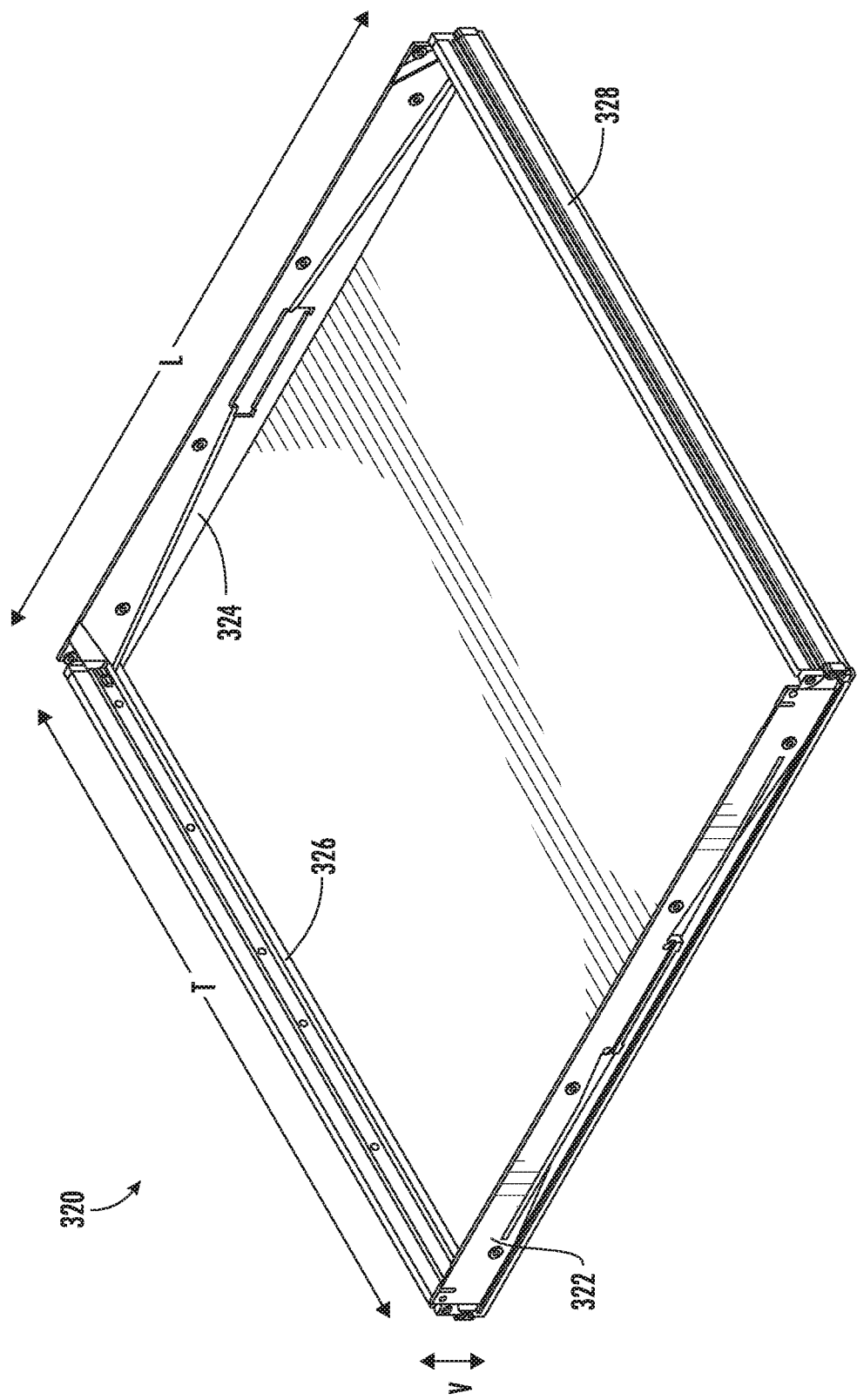
FIG. 16 depicts a frame of a lighting fixture according to example embodiments of the present disclosure.
Figure 17:
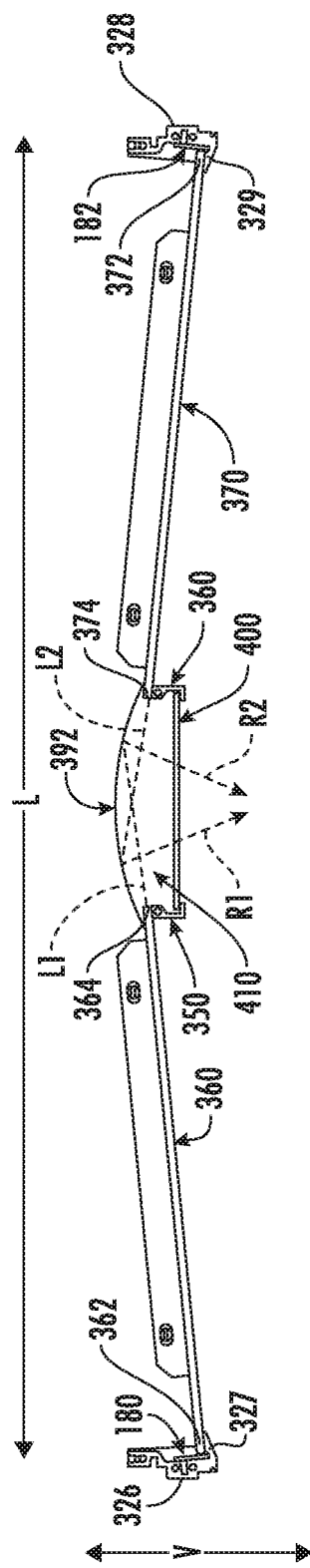
FIG. 17 depicts a cross-sectional view of a lighting fixture according to example embodiments of the present disclosure.

Referring now to FIGS. 15 through 17, another embodiment of a lighting fixture 300 is provided according to example embodiments of the present disclosure. The lighting fixture 300 of FIG. 15 is substantially similar to the lighting fixture 100 discussed above with reference to FIGS. 1 through 14. Accordingly, the same or similar reference numbers may be assigned to the same or similar components. For instance, the lighting fixture 300 of FIG. 15 includes a first panel 360 and a second panel 370. Additionally, the lighting fixture 300 includes an illuminated surface 400. However, in contrast to the lighting fixture 100 of FIG. 2, the lighting fixture 300 of FIG. 15 includes a second illuminated surface 400. More specifically, the second illuminated surface 400 can be a third panel positioned between the first panel 350 and the second panel 360 along the lateral direction L. As shown, the third panel is spaced apart from the first panel 360 and the second panel 370 along the vertical direction V. More specifically, the third panel is positioned below the first panel 360 and the second panel 370 along the vertical direction V. Additionally, the third panel is supported, at least in part, between a first rail 350 of the lighting fixture 300 and a second rail 352 of the lighting fixture 300.

The first panel 360 can include a plurality of surfaces and at least one edge formed therebetween. As shown, the first panel 360 can extend along both the lateral direction L and the transverse direction T. More specifically, the first panel 360 can extend along the lateral direction L between the first rail 350 and the first side 326 of the frame 320. Additionally, the first panel 360 can extend along the transverse direction T between the first and second ends 322, 324 of the frame 320. In some implementations, the first panel 360 can be supported, at least in part, by a first projection (e.g., first projection 140 of FIG. 3) of the first and second ends 322, 324 of the frame 320. Alternatively or additionally, the first panel 360 can be supported, at least in part, by the first rail 350 and the first side 326 of the frame 320. In some implementations, the first panel 360 can rest on a lip 327 of the first side 326. The lip 327 can, in some embodiments, be spaced apart from the first rail 350 along the vertical direction V. More specifically, the lip 327 can be positioned below the first rail 350 along the vertical direction V. In this manner, a plane defined by the first panel 360 can intersect a plane defined by the frame 120 at an angle. In some embodiments, the lip 327 is integrally formed with the first side 326. In other embodiments, however, the lip 327 can be a separate component that is attachable to the first side 326 of the frame 120.

As shown, the second panel 370 can be spaced apart from the first panel 360 along the lateral direction L. The second panel 370 can include a plurality of surfaces and at least one edge formed therebetween. As shown, the second panel 370 can extend along both the lateral direction L and the transverse direction T. More specifically, the second panel 370 can extend along the lateral direction L between the second rail 352 and the second side 328 of the frame 320. Additionally, the second panel 370 can extend along the transverse direction T between the first and second ends 322, 324 of the frame 320. In some implementations, the second panel 370 can be supported, at least in part, by a second projection (e.g., second projection 142 of FIG. 3) of the first and second ends 322, 324 of the frame 120. Alternatively or additionally, the second panel 370 can be supported, at least in part, by the second rail 352 and the second side 328 of the frame 320. In some implementations, the second panel 370 can rest on a lip 329 of the second side 328. The lip 329 can, in some embodiments, be spaced apart from the second rail 352 along the vertical direction V. More specifically, the lip 329 can be positioned below the second rail 352 along the vertical direction V. In this manner, a plane defined by the second panel 370 can intersect a plane defined by the frame 320 at an angle. In some embodiments, the lip 329 can be integrally formed with the second side 328. In other embodiments, however, the lip 329 can be a separate component that is attachable to the second side 328 of the frame 320.

In some implementations, the first panel 360 can include a first light guide having a receiving edge 362 and an emitting edge 364. The receiving edge 362 of the first light guide 360 can be positioned adjacent the first light source 180 of the lighting fixture 100. In some embodiments, the second panel 370 can include a second light guide having a receiving edge 372 and an emitting edge 374. The receiving edge 372 of the second light guide 370 can be positioned adjacent the second light source 182 of the lighting fixture 100.

In some embodiments, the lighting fixture 300 can define a mixing chamber or integrating cavity 410. More specifically, the integrating cavity 410 can be defined, at least in part, along the lateral direction L between the emitting edge 364 of the first panel 360 and the emitting edge 374 of the second panel 370. Additionally, the integrating cavity 410 can be defined, at least in part, along the vertical direction V between the at least a portion 392 of the light reflector and the second illuminated surface (e.g., third panel 400). A first ray L1 of light exiting the first panel 360 via the emitting edge 364 thereof can reflect off of the light reflector and exit the lighting fixture 100 as a first reflected ray R1 of light. More specifically, the first reflected ray R1 of light can pass through the third panel 400. Alternatively or additionally, a second ray of L1 of light exiting the second panel 170 via the emitting edge 174 thereof can reflect off of the light reflector and exit the lighting fixture 100 as a second reflected ray R2 of light. More specifically, the second reflected ray R2 of light can pass through the third panel 400. In this manner, the third panel 400 can be illuminated via the first and second light source 180, 182.

Figure 18:
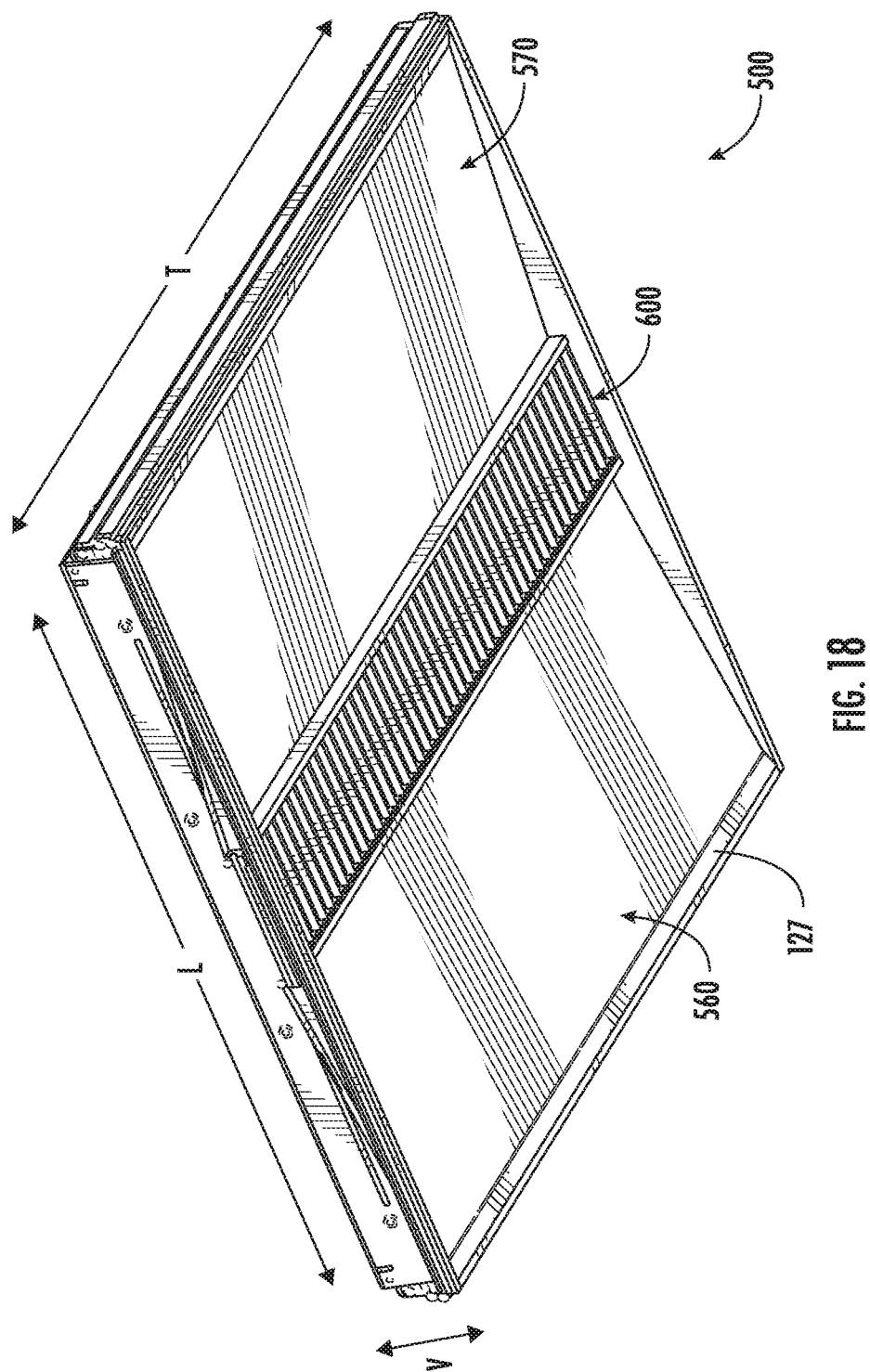
FIG. 18 depicts yet another embodiment of a lighting fixture according to example embodiments of the present disclosure.

Referring now to FIG. 18, yet another embodiment of a lighting fixture 500 is provided according to example embodiments of the present disclosure. The lighting fixture 500 is substantially similar to the lighting fixture 300 discussed above with respect to FIG. 15. Accordingly, the same or similar reference numbers may be used for components that are the same or similar. For instance, the lighting fixture 500 includes a first panel 560 and a second panel 570. However, in contrast to the illuminated surface 400 of the lighting fixture 300 depicted in FIG. 13, the lighting fixture 500 of FIG. 18 includes an illuminated surface 600. As shown, the illuminated surface 600 can be a baffle defining one or more slots. As shown, the baffle is supported, at least in part, between the first rail 550 and the second rail 552 along the lateral direction L.

Figure 19:
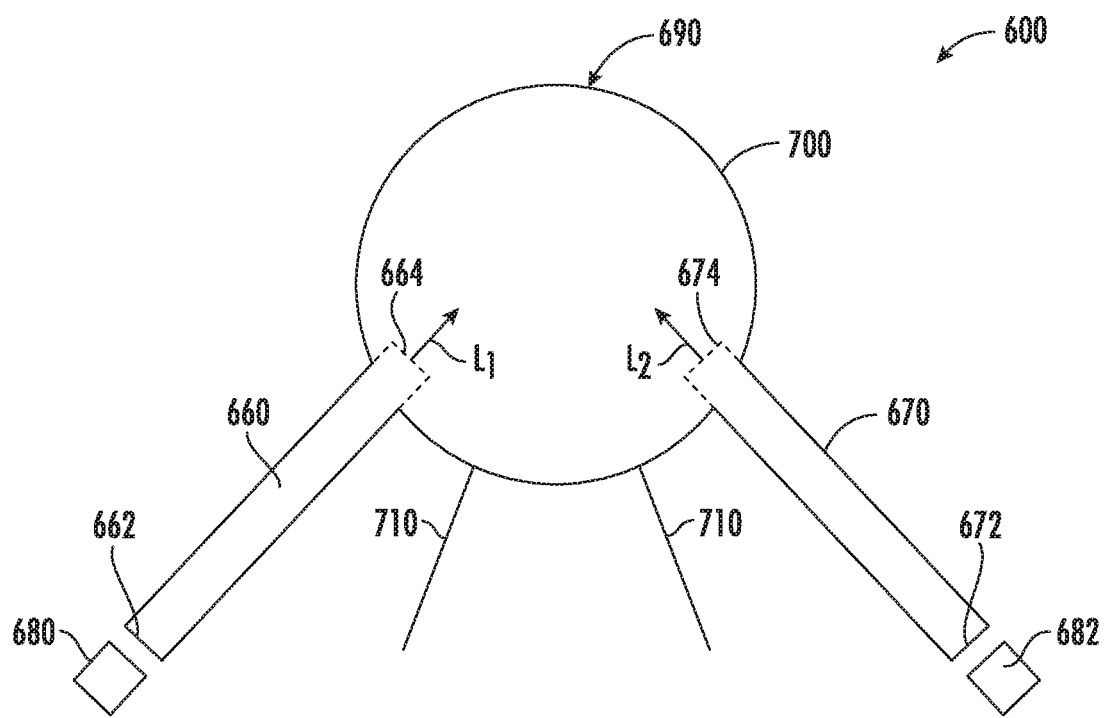
FIG. 19 depicts a cross-sectional view of a lighting fixture according to example embodiments of the present disclosure.

Referring now to FIG. 19, a cross-sectional view of an example lighting fixture 600 is provided according to the present disclosure. The lighting fixture 600 can include a first panel 660. In some implementations, the first panel 660 can include a first light guide having a receiving edge 662 and an emitting edge 664. As shown, a first light source 680 of the lighting fixture 600 can be positioned to illuminate the receiving edge 662 of the first light guide. Furthermore, in some implementations, the first light guide can be etched to transmit light from the receiving edge 662 to the emitting edge 664. In this manner, light emitted from the first light source 680 can enter the first light guide via the receiving edge 662 and exit the first light guide via the emitting edge 664.

As shown, the lighting fixture 600 can further include a second panel 670. In some implementations, the second panel 670 can include a second light guide having a receiving edge 672 and an emitting edge 674. As shown, a second light source 682 of the lighting fixture 600 can be positioned to illuminate the receiving edge 672 of the second light guide. Furthermore, in some implementations, the second light guide can be etched to transmit light from the receiving edge 672 to the emitting edge 674. In this manner, light emitted from the second light source 682 can enter the second light guide via the receiving edge 672 and exit the second light guide via the emitting edge 674.

As shown, the lighting fixture 600 can include an illuminated surface 690. In some implementations, the illuminated surface 690 can be an optic 700 positioned to receive a first ray of light $L_1$ exiting the first light guide and a second ray of light $L_2$ exiting the second light guide. More specifically, the optic 700 can receive the first ray of light $L_1$ via the emitting edge 664 of the first light guide. Conversely, the optic 700 can receive the second ray of light $L_2$ via the emitting edge 674 of the second light guide. As shown, light 710 can exit the lighting fixture 600 via the optic 700. In this manner, the light 710 can illuminate a room or area in which the lighting fixture 600 is located.

In some implementations, the light 710 exiting the optic 700 can be directed towards a floor of the room or area in which the lighting fixture 600 is located. In this manner, the lighting fixture 600 can be used to provide downlighting. It should be understood, however, that the optic 700 can be configured to direct the light 710 in any suitable direction.

For instance, in some implementations light exiting the 700 can be directed upward towards the ceiling of the room or area in which the lighting fixture 600 is located. In this manner, the lighting fixture 600 can be used to provide uplighting. It should also be appreciated that the optic 700 can be configured to distribute the light 710 according to any suitable light distribution pattern.

In some implementations, the optic 700 can be a total internal reflection (TIR) lens. It should be appreciated that the TIR lens can have any suitable shape and configuration. For instance, in some implementations the TIR lens can be a linear TIR lens. It should also be appreciated that the lighting fixture 600 can include any suitable number of panels. In this manner, the optic 700 can be configured to receive light from any suitable number of light guides.

Example aspects of the present disclosure are discussed with light fixture 100, 300, 500, 600 for purposes of illustration and discussion. However, those of ordinary skill in the art, using the disclosure provided herein, will understand that other suitable lighting fixture can be used without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture defining a lateral direction, a transverse direction, and a vertical direction, the lighting fixture comprising:
    at first panel;
    a second panel spaced apart from the first panel;
    at least one light source positioned adjacent an edge of the first panel to illuminate the first panel;
    an illuminated surface positioned to receive light from at least one of the first panel and the second panel,
    wherein at least a portion of light emitted from the at least one light source exits the lighting fixture at a location that is different than the first panel, and
    wherein the illuminated surface comprises an optic positioned to receive light exiting the first panel, and wherein the light the optic receives from the first panel exits the lighting fixture via the optic.

2. The lighting fixture of claim 1, further comprising at least one light source positioned adjacent an edge of the second panel to illuminate the second panel.

3. The lighting fixture of claim 2, wherein the optic is positioned to receive light exiting the second panel, and wherein the light the optic receives from the second panel exits the lighting fixture via the optic.

4. The lighting fixture of claim 3, wherein the optic comprises a total internal reflection (TIR) lens.

5. The lighting fixture of claim 1, wherein the light exits the first panel via a second edge of the first panel that is different than the edge illuminated by the at least one light source.

6. The lighting fixture of claim 1, wherein:
    the edge is a first edge;
    a first portion of the light emitted from the at least one light source exits the lighting fixture from a first surface of the first panel;

a second portion of the light emitted from the at least one light source exits a second edge of the first panel; and the second portion of the light exits the lighting fixture at a location that is different than the first edge, the second edge, and the first surface of first panel.

7. The lighting fixture of claim 6, wherein the lighting fixture further comprises:
at least one additional surface configured to redirect the second portion of the light from the second edge to the location that is different than the first edge, the second edge, and the first surface of first panel.

8. The lighting fixture of claim 7, wherein the lighting fixture further comprises:
a mixing chamber defined, at least in part, by the at least one additional surface, the mixing chamber configured to redirect the second portion of the light exiting the second edge of the first panel.

9. The lighting fixture of claim 8, wherein the mixing chamber is concave relative to a first plane extending in the lateral direction and the longitudinal direction.

10. The lighting fixture of claim 1, wherein the illuminated surface comprises a light reflector configured to reflect light from at least one of the first panel and the second panel.

11. The lighting fixture of claim 10, wherein at least a portion of the light reflector is positioned directly above a gap defined between the first panel and the second panel along the lateral direction.

12. A lighting fixture comprising:
a first panel including a plurality of surfaces and a first edge formed therebetween;
a second panel including a plurality of surfaces and a second edge formed therebetween;
a first set of one or more light emitting diodes (LEDs) positioned adjacent to the first edge to illuminate the first panel;
a second set of one or more LEDs positioned adjacent to the second edge to illuminate the second panel; and
an illuminated surface positioned to receive light from at least one of the first panel and the second panel.

13. The lighting fixture of claim 12, wherein the illuminated surface comprises a light reflector configured to reflect light from at least one of the first panel and the second panel.

14. The lighting fixture of claim 13, wherein the light reflector extends adjacent a first surface of the first panel and a second surface of the second panel.

15. The lighting fixture of claim 12, wherein the illuminated surface comprises an optic positioned to receive light exiting the first panel.

16. The lighting fixture of claim 15, wherein the optic is positioned to receive light exiting the second panel.

17. A lighting fixture, comprising:
a first panel including a plurality of surfaces and a first edge formed therebetween;
a second panel including a plurality of surfaces and a second edge formed therebetween;
a first set of one or more light emitting diodes (LED) positioned adjacent to the first edge to illuminate the first panel;
a second set of one or more LED(s) positioned adjacent to the second edge to illuminate the second panel;
a light reflector positioned to reflect light emitted from at least one of the first panel and the second panel; and
a third panel positioned to receive light reflected off of the light reflector.

18. The lighting fixture of claim 17, wherein the third panel extends along the lateral direction at a height in the vertical direction that is below a highest point of the first panel and a highest point of the second panel.

19. The lighting fixture of claim 18, wherein:
the first light guide includes a receiving edge and an emitting edge, the receiving edge positioned adjacent the first set of one or more LEDs; and
the second light guide includes a receiving edge and an emitting edge, the receiving edge of the second light guide positioned adjacent the second set of one or more LEDs.

20. The lighting fixture of claim 17, wherein:
the first panel includes a first light guide; and
the second panel includes a second light guide.

* * * * *